United States Patent
Ma et al.

(10) Patent No.: US 9,773,431 B2
(45) Date of Patent: Sep. 26, 2017

(54) BLOCK ENCRYPTION SECURITY FOR INTEGRATED MICROCONTROLLER AND EXTERNAL MEMORY SYSTEM

(75) Inventors: Edward Tang Kwai Ma, Plano, TX (US); Stephen N. Grider, Argyle, TX (US)

(73) Assignee: Maxim Integrated Products, Inc., San Jose, CA (US)

(*) Notice: Subject to any disclaimer, the term of this patent is extended or adjusted under 35 U.S.C. 154(b) by 941 days.

(21) Appl. No.: 12/615,865

(22) Filed: Nov. 10, 2009

(65) Prior Publication Data

US 2011/0113260 A1    May 12, 2011

(51) Int. Cl.
| | |
|---|---|
| *G06F 11/30* | (2006.01) |
| *G06F 12/14* | (2006.01) |
| *G09C 1/00* | (2006.01) |
| *G06F 21/85* | (2013.01) |
| *H04L 9/06* | (2006.01) |

(52) U.S. Cl.
CPC ............ *G09C 1/00* (2013.01); *G06F 21/85* (2013.01); *H04L 9/0618* (2013.01); *H04L 2209/127* (2013.01)

(58) Field of Classification Search
CPC ......... G06F 21/82; G06F 21/85; G06F 21/72; G06F 12/14; G06F 12/1408
USPC .................................. 713/189–194, 141–143
See application file for complete search history.

(56) References Cited

U.S. PATENT DOCUMENTS

| | | | | |
|---|---|---|---|---|
| 5,513,262 | A * | 4/1996 | van Rumpt | G06F 21/80 380/28 |
| 5,825,878 | A * | 10/1998 | Takahashi | G06F 21/79 713/190 |
| 5,892,826 | A * | 4/1999 | Brown et al. | 713/190 |
| 5,987,572 | A * | 11/1999 | Weidner et al. | 711/155 |
| 6,523,118 | B1 * | 2/2003 | Buer | 713/189 |
| 2002/0029345 | A1 * | 3/2002 | Kawasaki | G06F 12/1408 713/190 |
| 2002/0114465 | A1 * | 8/2002 | Shen-Orr | G06Q 20/10 380/231 |
| 2002/0199111 | A1 * | 12/2002 | Clark et al. | 713/194 |
| 2003/0046563 | A1 * | 3/2003 | Ma et al. | 713/190 |
| 2004/0153657 | A1 * | 8/2004 | Fujiwara | G06F 8/60 713/191 |

(Continued)

OTHER PUBLICATIONS

Office Action issued Jun. 3, 2014, in corresponding Chinese Patent Application No. 201010538183.4.
(Continued)

*Primary Examiner* — Michael S McNally
*Assistant Examiner* — Trong Nguyen
(74) *Attorney, Agent, or Firm* — North Weber & Baugh LLP (57) ABSTRACT

A secure microcontroller system comprising an integrated cache sub-system, crypto-engine, buffer sub-system and external memory is described according to various embodiments of the invention. The secure microcontroller incorporates block encryption methods to ensure that content communicated between the integrated microcontroller and external memory is protected and real-time performance of the system is maintained. Additionally, the microcontroller system provides a user-configurable memory write policy in which memory write protocols may be selected to balance data coherency and system performance.

22 Claims, 7 Drawing Sheets

(56) References Cited

U.S. PATENT DOCUMENTS

| | | | |
|---|---|---|---|
| 2005/0038964 A1* | 2/2005 | Hooper et al. | 711/143 |
| 2006/0010328 A1* | 1/2006 | Esaka et al. | 713/190 |
| 2006/0015748 A1* | 1/2006 | Goto | G06F 21/52 |
| | | | 713/190 |
| 2006/0174137 A1* | 8/2006 | Carr | G06F 21/72 |
| | | | 713/189 |
| 2008/0007561 A1* | 1/2008 | Thompson | G06F 12/0888 |
| | | | 345/557 |
| 2009/0157954 A1* | 6/2009 | Chung et al. | 711/104 |
| 2009/0172415 A1* | 7/2009 | Takeda | 713/190 |
| 2010/0325367 A1* | 12/2010 | Kornegay et al. | 711/143 |

OTHER PUBLICATIONS

Office Action dated Nov. 14, 2014, in corresponding Chinese Patent Application No. 201010538183.4.
Office Action dated Jun. 3, 2015, in related Chinese Application No. 201010538183.4, filed Nov. 10, 2010 (22pgs).
Office Action dated Nov. 2, 2015, in Chinese Patent Application No. 201010538183.4, filed Nov. 10, 2010 (28pgs).
English translation of Notification of the Reexamination dated Sep. 28, 2016, in Chinese Patent Application No. 201010538183.4, filed Nov. 10, 2010 (15pgs).
Office Action dated Mar. 24, 2017, in Chinese Patent Application No. 201010538183.4 (22pgs).

* cited by examiner

BLOCK ENCRYPTION SECURITY FOR INTEGRATED MICROCONTROLLER AND EXTERNAL MEMORY SYSTEM

BACKGROUND

A. Technical Field

The present invention relates generally to microcontrollers, and more particularly, to the secure management of block data within an integrated microcontroller cache subsystem and external memory device(s).

B. Background of the Invention

Content protection within a processor or microcontroller has been a challenge for the electronic industry for some time. As semiconductor technology has advanced, many microcontrollers have become complex integrated systems-on-chip. However, systems-on-chip technology is often time limited by the amount of memory space that can be effectively integrated and managed internally within the microcontroller. Integrating a larger memory within a microcontroller requires that additional space, timing, power and control issues be addressed when the microcontroller is designed. This issue of integrating internal memory within a microcontroller will become even more significant as future microcontroller applications are developed which demand larger memory to store both data and instructions.

In addressing these issues, one approach is to move memory to a location external to the integrated microcontroller. This allows for both power and space constraints to be transitioned outside of the integrated microcontroller circuit. For many microcontroller systems, the use of external memory is a preferred solution for storage of both data and program code in terms of both size and cost. However, the protection of stored content within external memory is problematic, especially for secure transactions with highly sensitive information, because this stored data resides outside of the secure environment of the integrated microcontroller. The use of external memory may potentially reduce the performance of the microcontroller because data coherency must be maintained between memory devices within the microcontroller system.

The use of external memory may also introduce latency within the microcontroller read/write command execution that drives the microcontroller performance below an acceptable level. The use of external memory further complicates a microcontroller because of the time requirements for accessing content from an external memory as well as securing that traffic between the microcontroller and external memory. In particular, the time required to read and/or write to an external memory may be burdensome to certain applications and significantly reduce the performance of the microcontroller. Additionally, because content within an external memory is secure, a microcontroller would need to decrypt content each time the content is processed within the microcontroller and re-encrypt each time content is stored within the external memory.

In many real-time applications, the time constraints caused by encryption and decryption functions, as well as associated read and write operations, may significantly reduce the performance of the microcontroller. Accordingly, what is needed is a microcontroller and external memory system that is able to more efficiently manage encryption and decryption operations within a real-time environment as well as manage stored content within this system. Additionally, the microcontroller must maintain data coherency within its memory and cache systems to ensure proper operation.

SUMMARY OF THE INVENTION

The present invention relates to a microcontroller that securely manages stored information within an integrated cache subsystem, an integrated buffer subsystem and external memory. Various embodiments of the microcontroller include structures and methods that ensure data coherency between the cache and buffer subsystems and the external memory. Additionally, data security is maintained within the entire microcontroller system by providing block-level encryption that secures data within the external memory as well as during transmission between the integrated microcontroller and external memory.

In certain embodiments of the invention, the integrated microcontroller comprises a bi-directional data path and an instruction path that provides strong, block-level encryption to content traversing the two paths. Both data and instructions are encrypted by a crypto engine or crypto engines that ensure data integrity when being stored in I/O buffers or memory external to the microcontroller. Read operations are provided that allow the microcontroller to be resource sensitive in identifying and reading blocks of data across the cache subsystem, the buffer subsystem and the external memory.

In various embodiments of the invention, the secure microcontroller system is provided with user-programmable write policies that allow an individual to balance data integrity and system performance relative to the microcontroller's intended application. In a write-through mode, data coherency is prioritized such that consistency between the integrated cache subsystem and external memory is highly ranked within the system write policy. In a write-back mode, system performance is prioritized such that write operations to the external memory are queued and await the memory bus to go idle or a total queued write operation count to exceed a threshold before stalling the memory bus and performing the write operations.

One skilled in the art will recognize the relative strength of block-level, cache-based encryption that is provided within the microcontroller. This encryption security and data management between cache subsystems and external memory allow the microcontroller to effectively operate in a number of different applications and environments Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Embodiments of the present invention provide systems, devices and methods for secure microcontrollers. In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

A. Secure Microcontroller

A secure microcontroller system comprising an integrated cache sub-system, crypto-engine, buffer sub-system and external memory is described according to various embodiments of the invention. The secure microcontroller incorporates block encryption methods to ensure that content communicated between the integrated microcontroller and external memory is protected and real-time performance of the system is maintained. Additionally, the microcontroller system provides a user-configurable memory write policy in which memory write protocols may be selected to balance data coherency and system performance.

The secure microcontroller is implemented with an on-chip cache sub-system for instruction and data that allows for dynamic read/write command execution within the cache sub-system and the external memory. During operation, the secure microcontroller uses a bi-directional data path that provides real-time decryption for read operations and real-time encryption for write operations to the external data memory. The microcontroller uses block-level cache-based encryption and decryption of both data and instructions stored within the external memory. A description of block encryption is described within U.S. Pat. No. 6,996,725, which patent is incorporated by reference in its entirety. A memory management unit is provided that controls the timing and execution of these operations within the integrated cache sub-system and the external memory.

Figure 1:
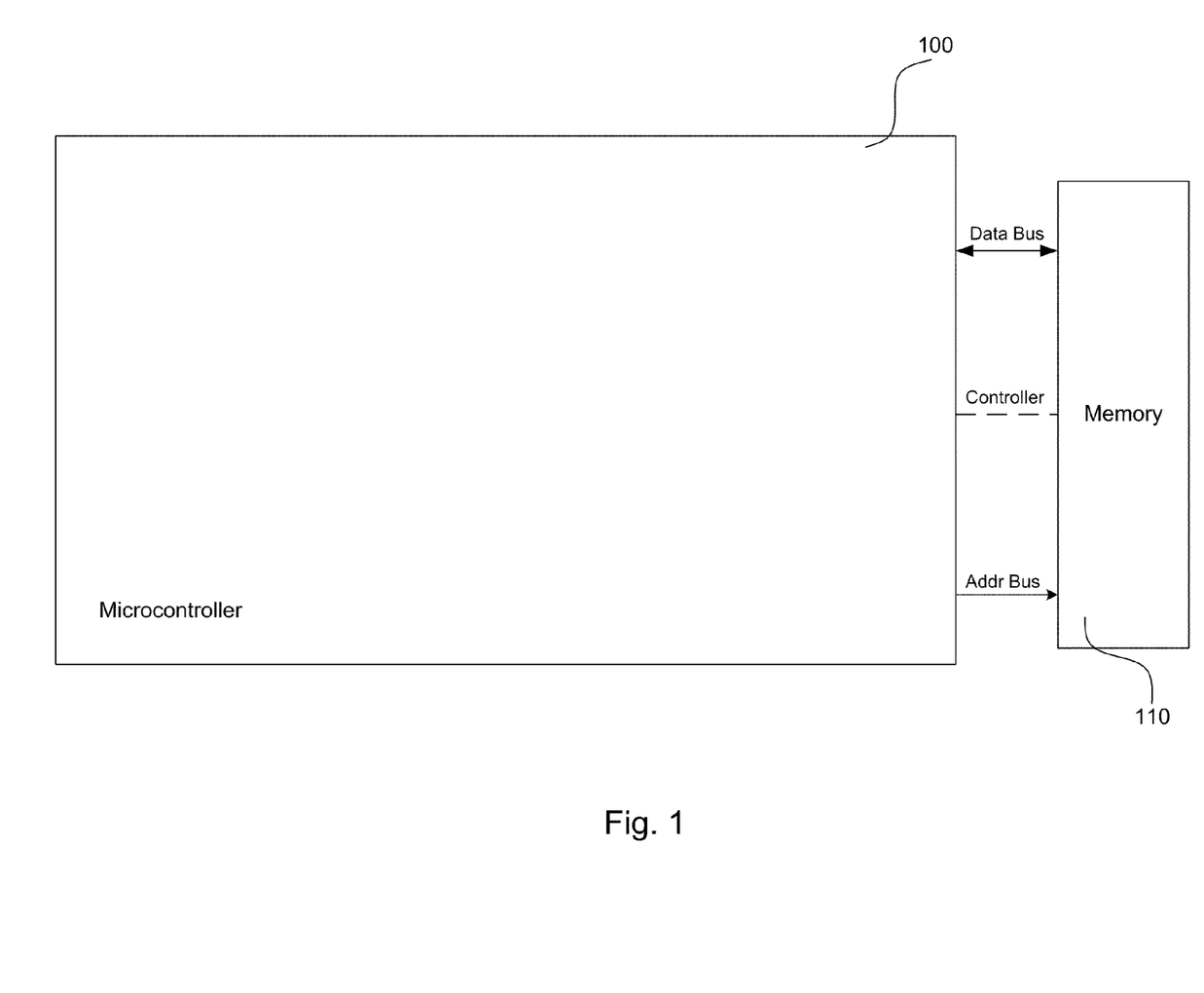
FIG. 1 generally illustrates a system including an integrated microcontroller and an external memory according to various embodiments of the invention.

FIG. 1 is a block diagram of a secure microcontroller system according to various embodiments of the invention. As shown in FIG. 1, the system comprises an integrated microcontroller 100 and an external memory 110. The integrated microcontroller 100 includes a central processing unit ("CPU"), a memory management unit, a cache subsystem, a buffer subsystem, a crypto-engine and various other components. In certain embodiments of the invention, the CPU of the microcontroller core 100 is implemented as a pipelined processor. Code execution is single cycle for linear code, but code branching incurs a single clock cycle penalty unless further measures are implemented such as a branch prediction unit. An instruction code operation generally comprises a number of cycles of code execution that defines a specific function. Additionally, the terms "code", "program code" and "instruction code" are considered synonymous.

In various embodiments, the processor uses the Harvard memory architecture with separate program and data memories. This memory architecture improves system bandwidth by allowing simultaneous access to program and data memories; it also permits using different word lengths for data storage. In certain embodiments of the invention, both program and data memories are integrated within a single external memory. However, one skilled in the art will recognize that multiple external memory device may also be used.

One skilled in the art will recognize that various processor architectures, clocking schemes and addressing methods may be implemented in accordance with embodiments of the invention.

The system memory, including both the cache subsystem and the external memory, stores various types of data and instructions within the microcontroller system including both the cache subsystem and external memory. One skilled in the art will recognize that the data memory can be implemented with a variety of memory technologies, such as SRAM, DRAM, Flash, etc.

Figure 2:
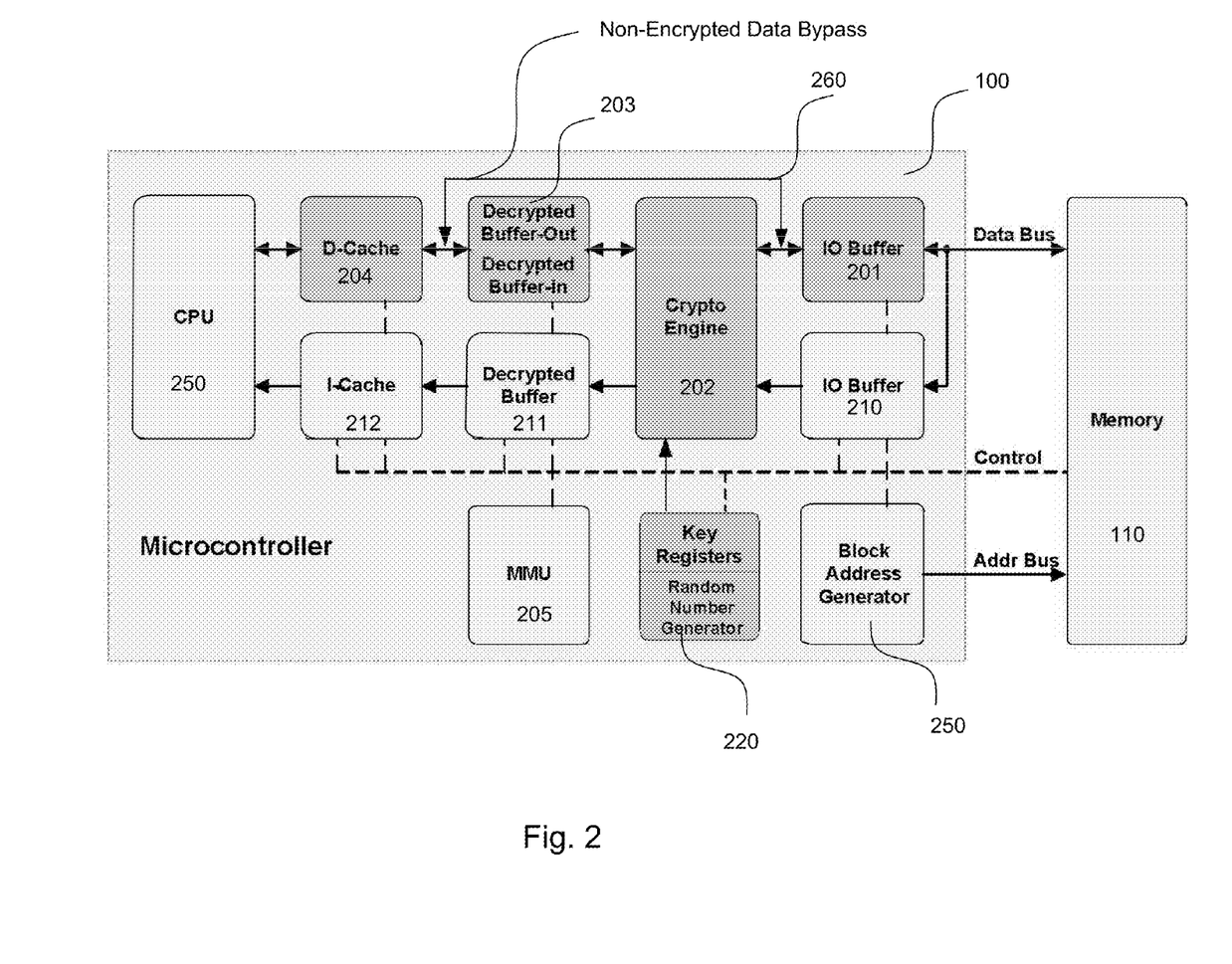
FIG. 2 illustrates a secure microcontroller that uses block encryption to protect content communicated with an external memory device according to various embodiments of the invention.

FIG. 2 illustrates an integrated microcontroller and external memory system according to various embodiments of the invention. The system comprises a bi-directional encryption/decryption data path that interfaces the microcontroller CPU 250 with the external memory 110. The encryption/decryption data path includes an interface to a data bus that connects to the external memory 110, a data I/O buffer 201, a crypto-engine 202, a decrypted buffer-out/decrypted buffer-in 203, and a D-cache 204 that connects to the microcontroller CPU 250. The system also has an instruction bus comprising an instruction I/O buffer 210, the crypto-engine 202, a decrypted buffer 211, and an I-cache 212 that connects to the microcontroller CPU 250. The system also has a memory management unit ("MMU") 205, key registers and random number generator 220, and a block address generator 230.

The crypto-engine 202 works on-demand of the data cache subsystem and implements strong cryptographic algorithm(s) that are recognized by one of skill in the art. The crypto-engine 202 employs a block cipher to perform block encryption along both the bi-directional data path and the instruction path. In particular, the crypto-engine 202 employs block ciphers and process data in blocks of multiple bytes/words that is generally greater than the data width for a processor and its internal storage elements. Examples of the block ciphers include DES, Triple DES, AES and others known to those of skill in the art. The actual implemented block cipher may affect the time required to perform block encryption.

For many applications, the crypto-engine 202 can be shared between instruction and data paths since cache line replacement is on-demanded only and the hit rate for both instruction and data caches are high. A system stall occurs when both caches and their associated buffers are missed at the same time. At this condition, data write-back has the priority of instruction and data cryptographic operations. For applications having heavy data traffic, dedicated crypto engines may be incorporated for a distinct data path and a distinct instruction path. One skilled in the art will recognize that various cryptographic structures, such as crypto engine implementations, as well as associated methods may be used to manage data and instruction paths within the microcontroller system.

In regards to the data path, the external memory 110 stores the encrypted data used by the microcontroller. The external memory 110 may also store unprotected data or clear data. If unprotected data is being retrieved, the microcontroller architecture supports a by-pass path on which the unprotected data is directly stored to the D-cache 204 and read by the microprocessor 250. In certain embodiments, this unprotected data is stored within a defined region of the external memory 110 so that the MMU 205 recognizes this as unprotected and causes it to be transmitted on the by-pass path 260.

For protected data, the encrypted data block is transmitted through the data path so that the crypto engine 202 can decrypt it prior to be processed by the CPU 250. The encrypted data block is retrieved from the external memory 110 via the data bus and stored within the data I/O buffer 201. The crypto-engine retrieves this buffered, encrypted data block and decrypts it using the keys stored within the key registers and generated from the random number generator 220, which is hardware on the chip in certain embodiments. The keys are typically generated during an initial set-up or calibration of the microcontroller. Additionally, the system may support functionality that filters weak keys from the random generator.

The key registers are usually battery-backed to ensure that power is maintained to the registers and key integrity is not lost. If a tamper attack is detected, the contents within the register will self-destruct. To further enhance security, the contents of the key registers can be periodically flipped to remove potential memory residue from the registers. Key bits may also be organized in small groups and group flipping is performed in an orderly fashion to minimize switching current. Correction logic may be placed between the key registers and crypto engine for maintaining data consistency.

After the protected data is decrypted, it is buffered within the decrypted buffer-in 203 which temporarily stores the decrypted data block and subsequently cached within the D-cache 204. The decrypted data is stored within the D-cache 204 according to management protocol such that it is made available to the CPU 250 for a certain period of time.

If data is being written to the external memory 110, then the data block is cached within the D-cache 204 and transmitted to the decrypted buffer-out 203. The data block is then encrypted by the crypto-engine 202 and subsequently buffered within the data I/O buffer 201. Finally, the encrypted data block is stored within the external memory 110 via the data bus. This writing of encrypted data blocks to the external memory 110 may be timed so that these operations occur during periods of time the controller is less active. In one embodiment, a write policy may be defined so that the data blocks are written into the D-cache 202 and maintained until activity on the data path is idle such that encryption operations may then be triggered. Additionally, the amount of buffered data blocks may be monitored so that if the total amount of buffered data blocks awaiting encryption exceeds a particular threshold, then the microcontroller operations are stalled so that these blocks may be encrypted and written to the external memory 110. Data consistency is maintained by managing data write-through and write-back operations within the controller memory architecture.

The MMU 205 manages the storage and retrieval of data stored within both the D-cache 204 and the external memory 110. The MMU 205 coordinates the flow of data through the data path including timing control, security checking, cache control, etc. The MMU 205 also monitors which data is being loaded within the D-cache 204 so that data access may be coordinated between the cache subsystem, buffer subsystem and the external memory 110. For example, in response to a data request, the MMU 205 may first determine whether the data is stored within the D-cache 204 as decrypted data. If the data is not cached, then it is retrieved from the external memory 110, subsequently decrypted and cached.

B. Integrated Microcontroller Cache Sub-System

The following description of a microcontroller cache sub-system is intended to illustrate certain embodiments of the invention. One skilled in the art will recognize that other cache subsystems and memory segmentation architectures may be realized in accordance with embodiments of the present invention.

The cache subsystem can be arranged in accordance with specific system requirements. For certain applications, separating instruction and data cache can significantly reduce potential resource conflicts and simply flow control of the MMU 205. It may also relax memory requirements for cache implementation.

To ensure system data integrity while maintaining optimal performance, the cache subsystem may support user selectable write-through and write-back functionality for write operations. For write-through operation, data coherency is maintained when new data is always updated to both data cache and external memory. However, performance may be at issue for certain applications that involve substantial data operations if data is frequency written back to the external memory. In this case, the user has the option to enable a write-back operation. To achieve data coherency, the cache tag includes an modify "m" status bit to signify modified data blocks that must be written back to the external memory before cache line replacement (or other bus master requesting data containing in the same block). Setting the modify bit actually creates a memory request to the MMU for memory write back. One skilled in the art will recognize that providing a user the option of calibrating the microcontroller to operate in a write-back or write-through mode allows a balance between data reliability and performance.

Actual data write-back is dependent on the updating policy of the system and is controlled by the MMU 205. In certain cases, the MMU 205 will push a modified data block to the external memory as soon as the I/O bus is idle. For some applications dealing with critical data, the MMU 205 incorporates an M counter that counts the number of the modified data blocks with a user programmable threshold value. If this feature is enabled and the M count is greater than the threshold value, the MMU 205 will stall the CPU operation and push modified data back to the external memory.

The MMU 205 also monitors warning signals from environmental circuits and tamper detectors, and push modified data back to the external memory in case of emergency. The crypto system can be powered by backup power in case of power fail until all data has been saved. The cache and its buffers are self-destructed on tamper attacks.

Figure 3:
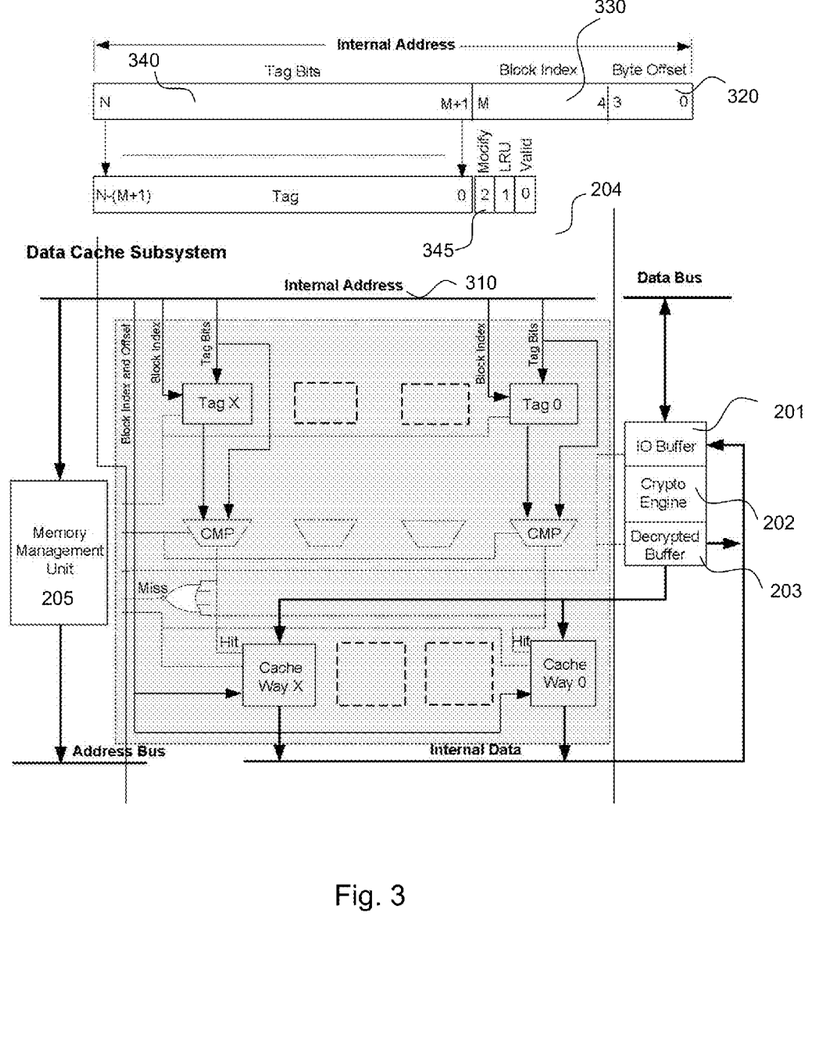
FIG. 3 illustrates a data cache integrated within the secure microcontroller according to various embodiments of the invention.

FIG. 3 illustrates an exemplary D-cache subsystem according to various embodiments of the invention. The D-cache subsystem allows the MMU 205 to effectively manage cache writes and reads within the complete memory system, including the external memory device 110. Referring to the internal address structure, an internal address bus is provided of a defined length that may be the same or different than the external bus (i.e., CPU bus). As shown in this figure, the internal address bus is N-bits long. A tag 340 is provided in which the data block address is stored in the cache. A block index 330 is provided which addresses the tag to the cache. A cache line byte offset 320 is provided which identifies a set of bytes being addressed within a certain cache location.

The tag 340 provides the MMU 205 with information to identify a cache match or miss. The tag 340 also includes the modify bit 345 which identifies whether the cached data (stored within the cache way) has been modified within the cache memory.

One skilled in the art will recognize that the number of cache ways may vary, effectively increasing or decreasing the depth of the cache, all in accordance of the present invention. In one embodiment of the invention, the D-cache comprised two cache ways, each being 64 words and each way having 64 tags.

Figure 4:
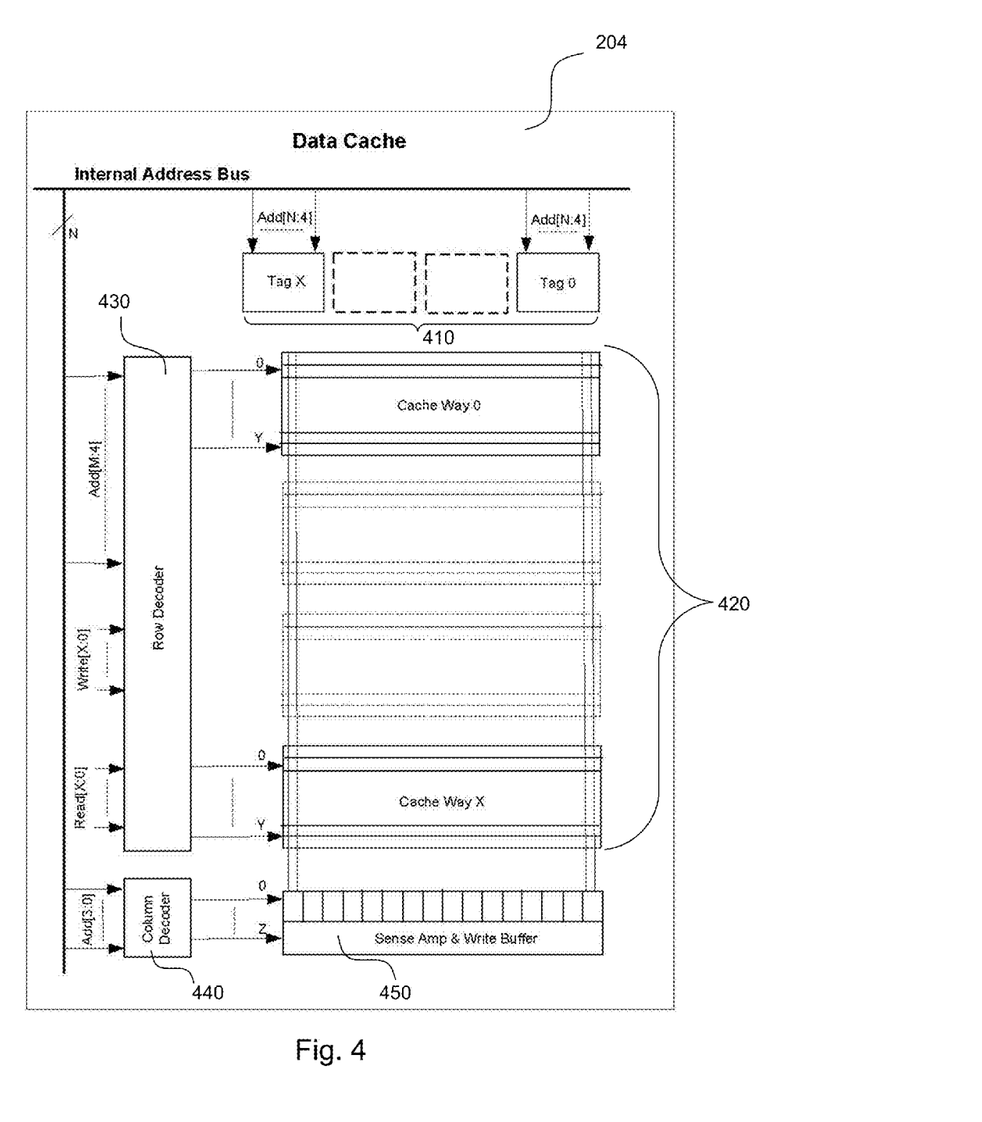
FIG. 4 is an illustration of a data cache subsystem according to various embodiments of the invention.

FIG. 4 illustrates a data cache implementation according to various embodiments of the invention. The data cache comprises tag 0 thru tag X 410 and cache way 0 thru cache way X 420. The data cache also comprises a row decoder 430 and column decoder 440. The data cache also comprises a sense-amplifier and write-buffer 450 related to the SRAM memory structure. The tag will identify a corresponding cache way that has been modified so that the MMU may manage memory accesses accordingly.

C. Management of Data Access across Cache Sub-System and External Memory

Figure 5:
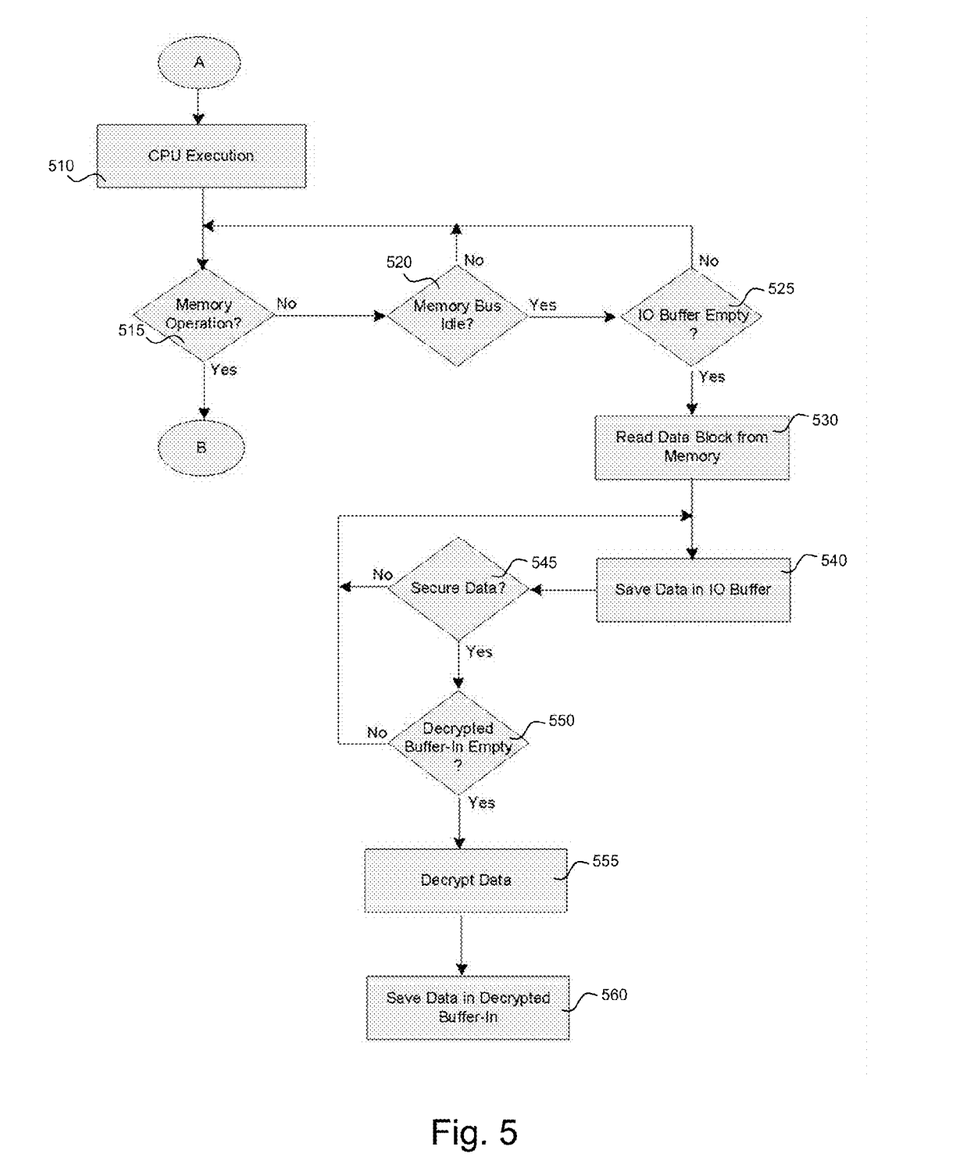
FIG. 5 is a flowchart illustrating a method for reading an encrypted data block from external memory and decrypting it according to various embodiments of the invention.
Figure 6:
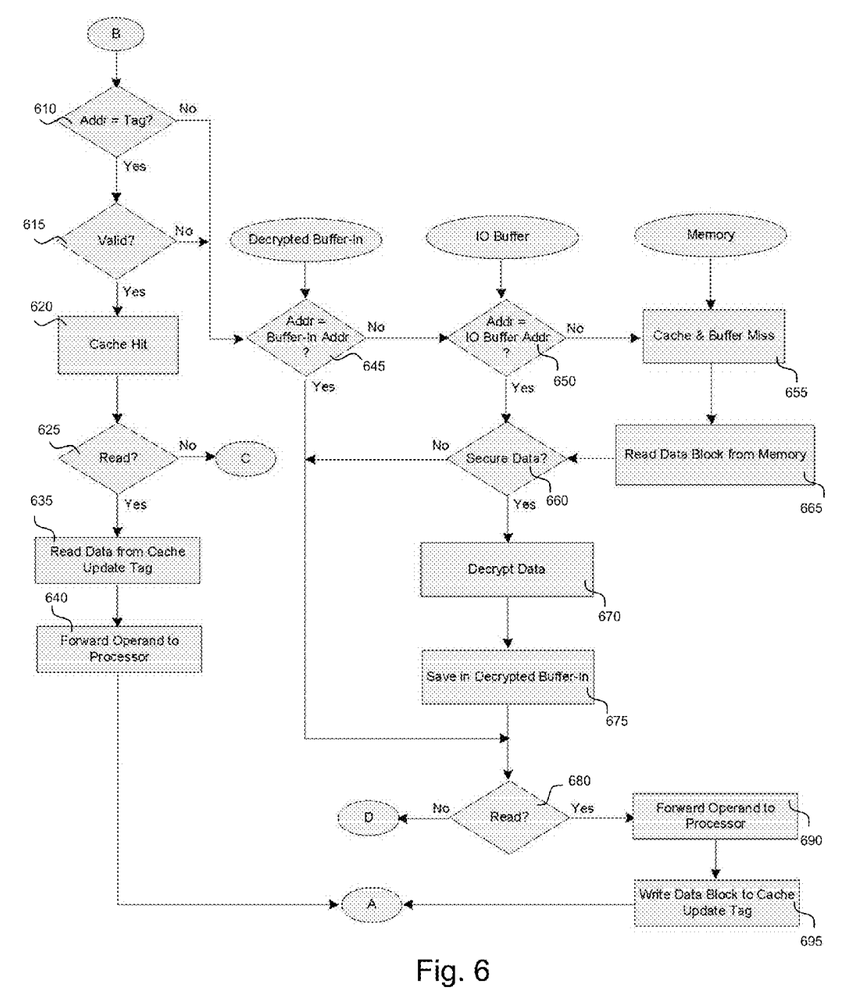
FIG. 6 is another flowchart illustrating a method for reading data blocks across a cache sub-system and external memory according to various embodiments of the invention.
Figure 7:
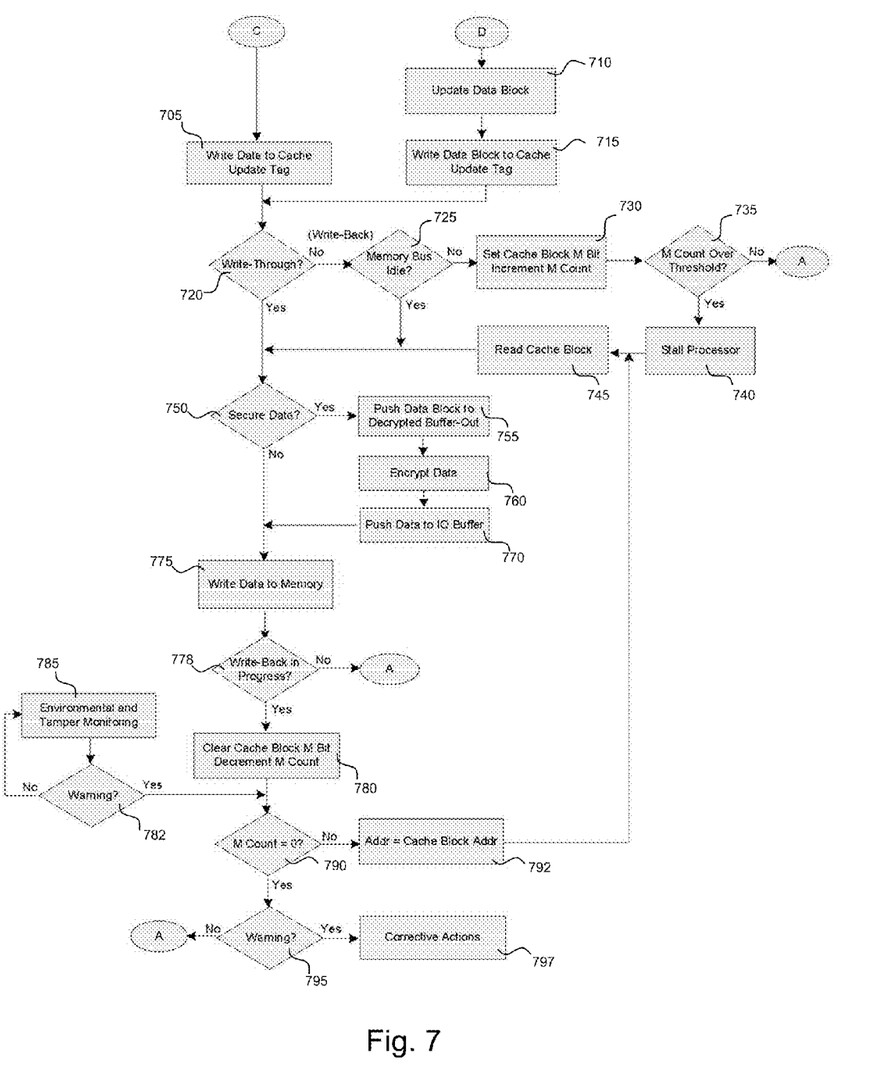
FIG. 7 is another flowchart illustrating a method for a method for write command management across the cache sub-system and external memory according to various embodiments of the invention.

FIGS. 5-7 illustrate methods, independent of structure, in which data access (i.e., read and/or write operations) is managed across both the cache sub-system and external memory according to various embodiments of the invention.

FIG. 5 illustrates a method for reading an encrypted data block from external memory and decrypting it according to various embodiments of the invention. The CPU generates an execution command 510 and a determination is made as to whether this is a memory operation 515, whether the memory bus is idle 520 and whether the data I/O buffer is empty 525. If the execution command is not a memory operation, the memory bus is idle and the I/O buffer is not empty, then a data block is read 530 from the external memory and saved 540 within the I/O buffer.

If the data block is encrypted data 545 and the decrypted buffer-in is empty 550, then the data block is decrypted 555 by the crypto-engine. The resulting decrypted data block is subsequently saved 560 within the decrypted buffer-in memory.

FIG. 6 illustrates a method for reading data blocks across a cache sub-system and external memory according to various embodiments of the invention. The method allows data block reads from integrated cache and buffer devices as well as a memory device(s) external to the integrated microcontroller. A command is analyzed to determine whether it is valid 615 and whether the address has a corresponding tag within the cache 610. If the command is valid and has an address tag within the cache sub-system, then a cache hit has occurred 620. If the command is a read data command 625, then the block is read from the cache and the tag is updated 635. Because the block in cache is not encrypted, the data may be directly forwarded 640 to the processor.

If the block to be read is not in the cache, then a search may be performed across the buffers within the integrated microcontroller system. A check is performed to identify whether the address is stored 645 within the decrypted buffer in. If it is and the command is a read command 680, then the block is read from the decrypted buffer-in and forwarded to the processor 690 and the data block is written to the cache 695 and the corresponding tag is updated.

If the block is not within the decrypted buffer-in, then a search of the I/O buffer is performed. If the address of the block matches an address within the I/O buffer address table, then a determination is made as to whether the block is encrypted 660. If the block is not encrypted, then if the command is a read command 680, the block is forwarded to the processor 690 and written to the cache 695. If the block is encrypted, the block is decrypted 670 by the crypto engine and saved in the decrypted buffer-in 675. If the command is a read command 680, then the block is forwarded to the processor 690 and written to the cache 695.

If the command address is not found in either the decrypted buffer-in or the I/O buffer, then the operation is a cache and buffer miss 655, and the data block is read from the external memory 665. If the block is not encrypted 660 and the command is a read command 680, then the block is forwarded 690 to the processor and written to cache 695. However, if the block is encrypted 660, then the block is decrypted 670 by the crypto engine and saved 675 in the decrypted buffer-in. If the command is a read command 680, then the decrypted block is forwarded 690 to the processor and written to cache 695.

FIG. 7 illustrates a method for write command management across the cache sub-system and external memory according to various embodiments of the invention. After a data block has been written or updated in the cache 705, 710, 715, the updated data block needs to be written also to the external memory to maintain data coherency across the cache subsystem and external memory.

In accordance with various embodiments of the invention, a write policy may define either a write-through mode or a write-back mode. If the write-through mode is selected 720, then the updated data block in cache will automatically be written to the external memory. If the data block is not encrypted data 750, then the data block is written directly to the external memory 775. If the data block is encrypted data 750, then the data block is pushed 755 to the decrypted buffer-out. Thereafter, the data block is encrypted 760 and pushed to the I/O buffer 770. The encrypted block is then written to the external memory 775.

If the write-back mode is selected 720, then the memory bus is checked 775 to determine if it is idle. If the bus is idle and the data block is not encrypted data 750, then the data block is written directly to the external memory 775. If the data block is encrypted data 750, then the data block is pushed 755 to the decrypted buffer-out. Thereafter, the data block is encrypted 760 and pushed to the I/O buffer 770. The encrypted block is then written to the external memory 775.

However, if the bus is active, then the cache block modify bit is set and the M count is incremented 730 and a check is performed to see if the M count 735 is over the threshold. If it is under the threshold, then the data block waits for either the threshold to be crossed or the bus to become idle. If the count is over the threshold, the processor is stalled 740 and the block is read 745 from the cache. Thereafter, the block is written to memory 775, the particular steps depending on whether the block is encrypted or not encrypted data.

If the microcontroller is operating in a write-back mode 778, then the system will monitor both the memory bus and the number of external memory write commands awaiting execution. As previously discussed, the queued write commands are executed during a processor stall if the total number of write commands exceeds a threshold value. However, if the memory bus becomes idle, then the queued commands are continually executed 792 until they have all completed 790 or until the memory bus becomes active with other operations.

Once the queued operations have completed, then the system checks to see if there are any warnings 795 and may take corrective actions 797 if necessary.

The microcontroller system also includes environmental and tamper monitoring 785 in which warnings 782 are identified in which a tampering event is occurring, the system is being reset or shutdown, or if the stability of the microcontroller system is jeopardized. In these instances, the queued memory writes are executed 792 until all are complete 790. It is important to note that the system recognizes the time or clock cycles required to exercise these commands and manages accordingly.

The foregoing description of the invention has been described for purposes of clarity and understanding. It is not intended to limit the invention to the precise form disclosed. Various modifications may be possible within the scope and equivalence of the appended claims. For example, the structures and functions described herein may also be applied to microcontroller systems that use integrated memory instead of or in cooperation with external memory.

We claim:

1. A secure integrated microcontroller comprising:
   a processor having a first and second interfaces, the processor communicates data to an external memory via a data path and communicates instructions to the external memory via an instruction path;
   a cache subsystem that caches a first decrypted data block corresponding to a first encrypted data block stored within the external memory;
   a crypto engine comprising a block cipher that is configured to perform block encryption along the data path and the instruction path; and
   a memory management unit coupled to the processor, the cache subsystem, and the external memory, the memory management unit controls timing and execution of operations within the cache subsystem and the external memory and identifies a data block to be read in response to a read command from the processor, the memory management unit configured to recognize unsecure data blocks and cause them to be communicated between the processor and the external memory via a bidirectional by-pass path coupling between a data cache and a data I/O buffer.

2. The secure integrated microcontroller of claim 1 wherein the crypto engine encrypts the first decrypted data block using at least one of an AES key, a DES key, and a Triple DES key.

3. The secure integrated microcontroller of claim 1 wherein the crypto engine is divided into a first distinct engine that encrypts the data and a second distinct engine that decrypts the instructions.

4. The secure integrated microcontroller of claim 1 wherein the memory management unit is programmable to operate in one of a plurality of different modes.

5. The secure integrated microcontroller of claim 4 wherein a write mode, within the plurality of different modes, is a write-through mode that defines a write policy for writing data to the external memory.

6. The secure integrated microcontroller of claim 4 wherein a write mode, within the plurality of different modes, is a write-back mode that defines a write policy for writing data to the external memory.

7. The secure integrated microcontroller of claim 1 wherein the memory management unit causes a memory erase in response to detecting a tamper event.

8. The secure integrated microcontroller of claim 1 wherein the memory management unit comprises environmental detection that causes a shutdown in response to detecting an environmental trigger that destabilizes the microcontroller.

9. The secure integrated microcontroller of claim 1 wherein the data block to be read is selected based on at least one of read latency of the first decrypted data block, the first encrypted data block, and a first buffered data block.

10. The secure integrated microcontroller of claim 9 wherein the first buffered data block is encrypted and stored in an I/O buffer.

11. The secure integrated microcontroller of claim 9 wherein the first buffered data block is decrypted and stored in a decrypted buffer-in.

12. The secure integrated microcontroller of claim 1 wherein the instruction path coupling the second interface with the processor.

13. The secure integrated microcontroller of claim 12 wherein the instruction path comprises an I/O buffer, the crypto engine, a decrypted buffer, and an instruction cache.

14. The secure integrated microcontroller of claim 1 further comprising a block address generator.

15. The secure integrated microcontroller of claim 1 wherein the cache subsystem comprises a modify bit architecture that identifies a modified block within the cache subsystem to the memory management unit.

16. A user-configurable integrated microcontroller comprising:
   a processor having a first and second interfaces to communicate encrypted data blocks to an external memory;
   cache subsystem comprising an instructions cache and a data cache, the cache subsystem caches a first decrypted data block corresponding to a first encrypted data block stored within the external memory;
   an integrated crypto engine that comprises a block cipher, the integrated crypto engine performs the decryption and that encrypts the first decrypted data block;
   an instruction path and a data path that couple the instructions cache and the data cache to respective processor interfaces; and
   a memory management unit that controls timing and execution of operations within the cache subsystem and the external memory and operates in one of a plurality of modes, a first mode in the plurality of modes being a write-through mode in which a first data block is written to the cache subsystem and subsequently written to the external memory independent of activity on the first and second interfaces, and a second mode in the plurality of modes being a write-back mode in which the first data block is written to the cache subsystem and subsequently written to the external memory in response to a number of data blocks stored within a queue exceeding a threshold value, the memory management unit configured to recognize unsecure data blocks and cause them to be communicated between the processor and the external memory via a bidirectional by-pass path coupling between the data cache and a data I/O buffer.

17. The user-configurable integrated microcontroller of claim 16 wherein:

the processor generates a plurality of read commands associated with a second data block; and the memory management unit performing a read operation of the second data block from either the cache subsystem or the external memory depending at least in part on a latency associated with the read operation.

18. The user-configurable integrated microcontroller of claim 17, wherein the integrated crypto engine encrypts and decrypts data blocks according to at least one cipher key stored within a key register.

19. The user-configurable integrated microcontroller of claim 18 wherein the integrated crypto engine pulls encrypted data blocks from an I/O buffer.

20. The user-configurable integrated microcontroller of claim 19 wherein the integrated crypto engine pushes decrypted data blocks to a decrypted buffer-in within a buffer subsystem.

21. The user-configurable integrated microcontroller of claim 20 wherein the integrated crypto engine pulls decrypted data blocks from a decrypted buffer-out within the buffer subsystem.

22. The user-configurable integrated microcontroller of claim 21 wherein the integrated crypto engine pushes encrypted data blocks to an I/O buffer.

* * * * *